United States Patent
Castro et al.

(10) Patent No.: US 7,257,520 B2
(45) Date of Patent: Aug. 14, 2007

(54) METHOD AND SYSTEM FOR IN-MOLD COATING FLOW SIMULATION

(75) Inventors: Jose M. Castro, Dublin, OH (US); Elliott J. Straus, Akron, OH (US); Xu Chen, St. Petersburg, FL (US)

(73) Assignees: Omnova Solutions, Inc., Fairlawn, OH (US); The Ohio State University, Columbus, OH (US)

( * ) Notice: Subject to any disclaimer, the term of this patent is extended or adjusted under 35 U.S.C. 154(b) by 406 days.

(21) Appl. No.: 10/836,358

(22) Filed: Apr. 30, 2004

(65) Prior Publication Data

US 2005/0246146 A1   Nov. 3, 2005

(51) Int. Cl.
*G06F 17/10* (2006.01)
*G06F 7/48* (2006.01)
*B29B 7/22* (2006.01)

(52) U.S. Cl. .............................. 703/2; 703/9; 700/203; 700/204; 264/255; 264/328.8

(58) Field of Classification Search .................. 703/2, 703/6, 9; 700/119, 200, 203, 204, 198; 264/328.8, 264/255; 425/96; 428/172, 192, 424.2, 428/319.7; 427/446
See application file for complete search history.

(56) References Cited

U.S. PATENT DOCUMENTS

| | | | | |
|---|---|---|---|---|
| 4,239,796 A * | 12/1980 | Shanoski et al. | ......... | 428/319.7 |
| 4,808,361 A * | 2/1989 | Castro et al. | ................ | 264/255 |
| 5,344,601 A * | 9/1994 | Newton | ........................ | 264/255 |
| 6,617,033 B1 * | 9/2003 | Straus et al. | ............. | 428/424.2 |
| 6,890,469 B2 * | 5/2005 | Straus et al. | ................ | 264/255 |
| 7,045,213 B2 * | 5/2006 | Straus | ........................ | 428/412 |
| 2003/0077426 A1 * | 4/2003 | Straus | ........................ | 428/192 |
| 2003/0082344 A1 * | 5/2003 | Straus et al. | ................ | 428/172 |
| 2004/0121034 A1 * | 6/2004 | McBain | ........................ | 425/96 |
| 2004/0148051 A1 * | 7/2004 | Straus | ........................ | 700/198 |
| 2005/0048218 A1 * | 3/2005 | Weidman | ..................... | 427/446 |

OTHER PUBLICATIONS

Im, Y.-T. A Computer-Aided-Design System for Forming Processes, Journal of Materials Processing Technology, vol. 89-90.*
Stroud et al., J.W. Process Considerations for the Application of PLC Control to Compression Molders, IEEE Annual Conference of Electrical Engineering Problems in the Rubber and Plastics Industry, Apr. 1994, pp. 63-69.*

* cited by examiner

*Primary Examiner*—Russell Frejd
(74) *Attorney, Agent, or Firm*—Fay Sharpe LLP

(57) ABSTRACT

A numerical method operating within a processor-based environment for predicting the fill pattern and coating pressure distribution for a substrate in a computer simulation of an in-mold coating flow within a two-dimensional flow domain having a plurality of possible inlet nodes for injection, which includes the steps of initializing pressure and thickness change of the substrate for at least one of the inlet nodes, determining which of the inlet nodes are newly filled nodes and new flow front nodes, calculating pressure for the newly filled nodes; updating thickness and coating volume of the substrate, checking if pressure and time step have converged, and updating pressure and time step and returning to the pressure calculation step if pressure and time step calculations have not converged, and determining whether the substrate is filled, and updating filling time and returning to the determining step if the substrate is not filled.

21 Claims, 11 Drawing Sheets

METHOD AND SYSTEM FOR IN-MOLD COATING FLOW SIMULATION

BACKGROUND OF THE INVENTION

The present invention relates generally to the process of in-mold coating. More particularly, the present invention relates to a method and system for improving the efficiency of the in-mold coating process by predicting the fill pattern and coating pressure distribution, which information is used to provide guidance on locating nozzles and the minimum clamping pressure needed. The present invention was developed for the coating of thermoplastics. It is to be appreciated, however, that the invention may relate to other similar environments and applications, including molded articles made from thermosets.

Molded thermoplastic and thermoset articles, such as those made from polyolefins, polycarbonates, polyesters, polystyrenes and polyurethanes, are Utilized in numerous applications including those for automotive, marine, recreation, construction, office products, and outdoor equipment industries. Often, application of a surface coating to a molded thermoplastic or thermoset article is desirable. For example, molded articles may be used as one part in multi-part assemblies. To match the finish of the other parts in such assemblies, the molded articles may require application of a surface coating that has the same finish properties as the other parts. Coatings may also be used to improve surface properties of the molded article such as uniformity of appearance, gloss, scratch resistance, chemical resistance, weatherability, and the like. Also, surface coatings may be used to facilitate adhesion between the molded article and a separate finish coat to be later applied thereto.

Numerous techniques to apply surface coatings to molded articles have been developed. Many of these involve applying a surface coating to molded articles after they are removed from their molds. These techniques are often multi-step processes involving surface preparation followed by spray-coating the prepared surface with paint or other finishes. In contrast, in-mold coating (IMC) provides a means of applying a surface coating to a molded article prior to its ejection from the mold.

IMC is carried out by injecting a liquid low viscosity thermoset material onto the surface of a substrate while it is still in the mold. The coating will then solidify and adhere to the substrate. The IMC process is thus integrated with conventional thermoplastic injection molding to improve the part surface quality and to protect it from outdoor exposure.

IMC has been successfully used for many years for exterior body panels made from compression molded sheet molding compound (SMC) to improve the surface quality of SMC moldings in terms of functional and cosmetic properties. When injected onto a cured SMC part, IMC cures and bonds to provide a paint-like surface.

Historically, much work with IMCs has been done on molded articles made from thermosets. Thermosets such as phenolics, epoxies, cross-linked polyesters, and the like, are a class of plastic composite materials that are chemically reactive in their fluid state and are set or cured by a reaction that causes cross-linking of the polymer chains. Once cured, subsequent heating may soften a thermoset but will not restore it to a fluid state.

Because of its distinct advantages, IMC is now being considered for injection-molded thermoplastic parts. Thermoplastics are a class of plastic materials that can be melted, cooled to a solid form, and repeatedly re-melted and solidified. The physical and chemical properties of many thermoplastic materials, together with their ease of moldability, make them materials of choice in numerous applications in the automotive, marine, recreation, construction, office products, outdoor equipment and other fields.

Similar to IMC for SMC, IMC for thermoplastics could be used either as a topcoat or as a primer. As a topcoat, IMC is applied to the end-use exterior surface of the thermoplastic substrate, either to improve its surface appearance to automotive levels or to protect the part from outdoor exposure or both. As a primer, IMC is applied to the exterior surface of the thermoplastic part before it is painted. IMC takes the place of the adhesion promoters now applied to the plastic parts, prior to painting. IMC is much more environmentally benign than the currently used adhesion promoters.

Processes have been developed wherein a fluid coating is injected onto and dispersed over the surface of a molded part and cured. A common method of injecting a fluid IMC onto the surface of a molded article involves curing (if a thermoset material) and cooling an article in the mold to the point that it has hardened sufficiently to accept the coating, reducing the pressure against the telescoping mold half to crack open or part the mold, injecting the fluid coating, and re-pressurizing the mold to distribute the coating over the surface of the molded article. The cracking or parting of the mold involves releasing the pressure exerted on the telescoping mold half to sufficiently move it away from the molded article, thereby creating a gap between the surface of the part and the telescoping mold half. The gap allows coating to be injected onto the surface of the part without needing to remove the part from the mold.

Other processes, such as injection molding, may require that pressure be maintained on the movable mold half so as to keep the cavity closed and to prevent resin from escaping along the parting line. Further, maintaining pressure on the resin material during molding, which also requires keeping the cavity closed, often is necessary to assist in providing a more uniform crystalline or molecular structure in the molded article. Without such packing, physical properties of the molded article tend to be impaired.

In addition to the problem of resin escaping along the parting line, packing constraints can sometimes create other problems when an IMC composition is to be injected into a mold containing a molded article. Specifically, some commercially available IMCs are generally thermoset materials that cure by the application of heat. Curing of these compositions is often achieved through transfer of residual heat from the molded article. If the coating composition were to be injected after a molded article has been sufficiently cooled (packed) to allow the mold to be depressurized and parted or cracked, the molded article may lack sufficient residual heat to cure the coating. Thus, for coating compositions designed to cure on an article, it is desirably injected prior to depressurizing the mold.

Because injection molding does not permit the mold to be parted or cracked prior to injection of the IMC composition into the mold cavity, the IMC composition must be injected under sufficient pressure to compress the article in all areas to be coated. The compressibility of the molded article dictates how and where the IMC composition covers it. The process of coating an injection molded article with a liquid IMC composition is described in U.S. Pat. No. 6,617,033.

The coating process consists generally of filling, packing and curing stages. During the filling stage, once the thermoplastic substrate has been solidified, but before demolding, IMC is injected into the mold and flows forward by compressing the substrate until the exterior surface of the substrate is completely covered. More coating material is injected into the cavity during the IMC packing stage to obtain a desired coating thickness. When the coating cures completely by chemical reaction, the thermoplastic part with IMC can be ejected out of the mold.

IMC nozzle location is a concern during the mold design of IMC for thermoplastic parts. It should be cosmetically acceptable since the injection location usually leaves a mark on the surface. It should guarantee 100% part coverage and minimize the potential for trapping air. Most of the molds used in the injection molding process do not have shear edges. Therefore, if the coating injection pressure exceeds the clamping pressure during the IMC process, mold opens, leading to coating leakage. As a result, controlling the coating injection pressure to avoid leakage is a big issue.

Thus, there is a need for a computer simulation tool to predict the fill pattern and coating pressure distribution, which information will, in turn, be used to provide guidance on locating IMC nozzles and to predict the minimum clamping pressure needed to avoid coating leakage.

SUMMARY OF THE INVENTION

In accordance with an aspect of the present invention, a numerical method operating within a processor-based environment for predicting the fill pattern and coating pressure distribution for a substrate in a computer simulation of an in-mold coating flow within a two-dimensional flow domain having a plurality of possible inlet nodes for injection is provided. The method includes the steps of initializing pressure and thickness change of the substrate for at least one of the inlet nodes; determining which of the inlet nodes are newly filled nodes and new flow front nodes; calculating pressure for the newly filled nodes; updating thickness and coating volume of the substrate; checking if pressure and time step have converged, and updating pressure and time step and returning to the pressure calculation step if pressure and time step calculations have not converged; and determining whether the substrate is filled, and updating filling time and returning to the determining step if the substrate is not filled.

In accordance with another aspect of the present invention, a recording medium readable with a computer for storing a program to predict the fill pattern and coating pressure distribution for a substrate in a computer simulation of an in-mold coating flow within a two-dimensional flow domain having a plurality of possible inlet nodes for injection and realize certain functions is provided. The functions to be realized include: initializing pressure and thickness change of the substrate for at least one of the inlet nodes; determining newly filled nodes and new flow front nodes; calculating pressure for the newly filled nodes; updating thickness and coating volume of the substrate; checking if pressure and time step have converged, and updating pressure and time step and returning to the pressure calculation step if pressure and time step calculations have not converged; and determining whether the substrate is filled, and updating filling time and returning to the determining step if the substrate is not filled.

In accordance with yet another aspect of the present invention, a system operating within a processor-based environment for predicting the fill pattern and coating pressure distribution for a substrate in a computer simulation of an in-mold coating flow within a two-dimensional flow domain having a plurality of possible inlet nodes for injection is provided. The system comprises means for initializing pressure and thickness change of the substrate for at least one of the inlet nodes; means for determining newly filled nodes and new flow front nodes; means for calculating pressure for the newly filled nodes; means for updating thickness and coating volume of the substrate; means for checking if pressure and time step have converged, and means for updating pressure and time step and means for returning to the pressure calculation step if pressure and time step calculations have not converged; and means for determining whether the substrate is filled, and means for updating filling time and returning to the determining step if the substrate is not filled.

BRIEF DESCRIPTION OF THE DRAWINGS

The invention may take physical form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENT

Figure 1:
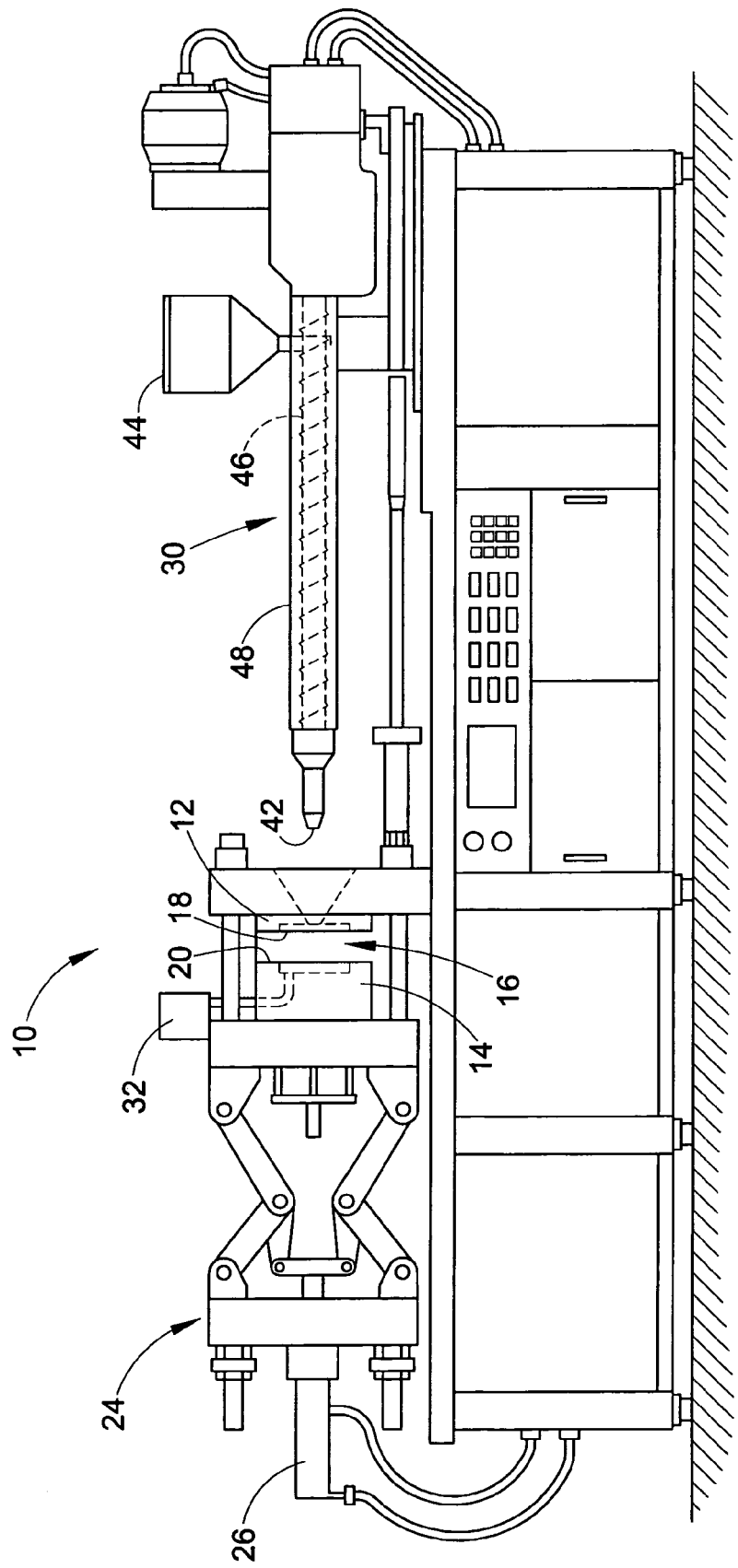
FIG. 1 is a side view of a molding apparatus having a movable mold half and a stationary mold half according to a preferred embodiment of the present invention.
Figure 2:
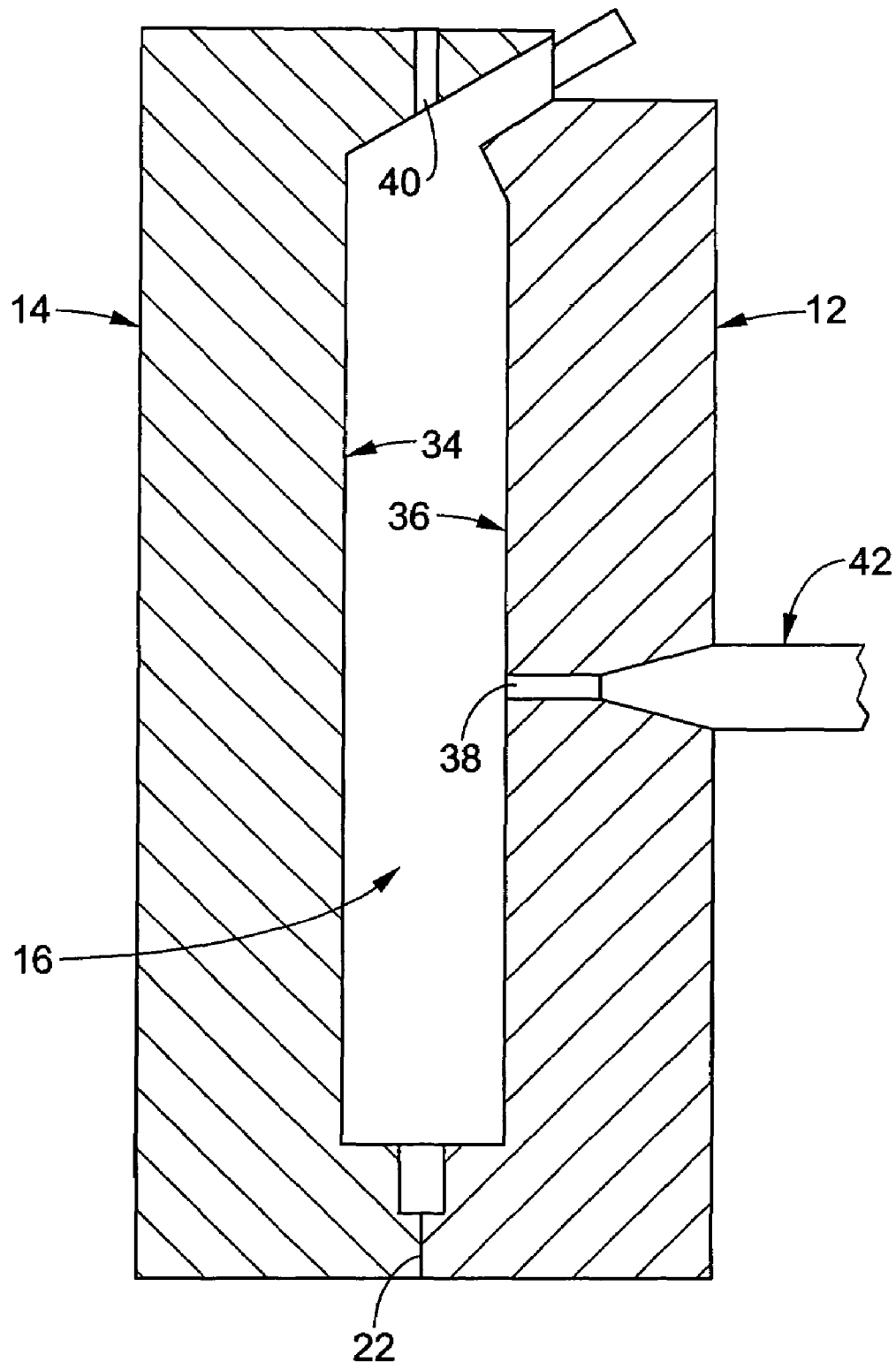
FIG. 2 is a partial cross-sectional view of the molding apparatus of FIG. 1 showing the movable mold half and the stationary mold half wherein the movable mold half is in a closed position to form a mold cavity, the mold cavity includes orifices for receiving first and second composition injectors.

Referring now to the drawings wherein like reference characters represent like elements and which illustrate certain embodiments of the invention, FIG. 1 shows a molding apparatus or injection molding machine 10, which includes a first mold half 12 that preferably remains in a stationary or fixed position relative to a second moveable mold half 14. FIG. 1 shows the movable mold half 14 in an open position. The first mold half 12 and the second mold half 14 are adapted to mate with one another to form a contained mold cavity 16 therebetween, as shown in FIG. 2. The mold halves 12,14 mate along a pair of surfaces 18 and 20 (FIG. 1) when the molding apparatus is in the closed position, forming a parting line 22 (FIG. 2) therebetween and around the mold cavity 16.

The movable mold half 14 reciprocates generally along a horizontal axis relative to the first mold half 12 through a clamping mechanism 24 with clamp actuator 26, such as through a hydraulic, pneumatic or mechanical actuator as known in the art. Preferably, the clamping pressure exerted by the clamping mechanism 24 should be capable of generating an operating pressure in excess of the pressures generated or exerted by either one of first composition injector 30 and second composition injector 32. For example, pressure exerted by the clamping mechanism 24 can range generally from 14 MPa (about 2,000 psi) to about 103 MPa (about 15,000 psi), preferably from about 27 MPa (about 4,000 psi) to about 83 MPa (about 12,000 psi), and more preferably from about 41 MPa (about 6,000 psi) to about 69 MPa (about 10,000 psi) of the mold surface.

In FIG. 2, the mold halves 12,14 are shown in a closed position abutting or mating with one another along the parting line 22 to form the mold cavity 16. The design of the cavity 16 can vary greatly in size and shape according to the desired end product or article to be molded. The mold cavity 16 generally has a first surface 34 on the second mold half 14 and a corresponding or opposite second surface 36 on the first mold half 12. The mold cavity 16 also contains a pair of separate orifices 38, 40 to allow the composition injectors 30,32 to inject their respective compositions.

The first composition injector 30 is that which is typical in an injection molding apparatus and is capable of injecting a thermoplastic or thermosetting composition, generally a resin or polymer, into the mold cavity 16. Owing to space constraints, the first injector 30 used to inject article-forming composition is positioned to inject material from the fixed mold half 12, although the first composition injector 30 could be reversed and placed in the movable mold half 14. The second composition injector 32 is capable of injecting an IMC composition into the mold cavity 16 to coat the molded article formed therein, although the second composition injector 32 alternatively could be positioned in the mold half 12.

In FIG. 1, the first composition injector 30 is shown in a "backed off" position, but the same can be moved in a horizontal direction so that a nozzle or the resin outlet 42 of the first injector 30 mates with the mold half 12. In the mated position, the injector 30 is capable of injecting its contents into the mold cavity 16. For purposes of illustration only, the first composition injector 30 is shown as a reciprocating-screw machine wherein a first composition can be placed in a hopper 44 and a rotating screw 46 can move the composition through a heated extruder barrel 48, where first composition or material is heated above its melting point. As the heated material collects near the end of a barrel 48, the screw 46 acts as an injection ram and forces the material through the nozzle 42 and into the mold cavity 16. The nozzle 42 generally has a valve (not shown) at the open end thereof and the screw 46 generally has a non-return valve (not shown) to prevent backflow of material into the screw 46.

The first composition injector 30 is not meant to be limited to the embodiment shown in FIG. 1 but can be any apparatus capable of injecting a flowable (e.g., thermoplastic or thermosetting) composition into the mold cavity 16. For example, the injection molding machine can have a mold half movable in a vertical direction such as in a "stack-mold" with center injection. Other suitable injection molding machines include many of those available from Cincinnati-Milacron, Inc. (Cincinnati, Ohio), Battenfeld Injection Molding Technology (Meinlerzhagen, Germany), Engel Machinery Inc. (York, Pa.), Husky Injection Molding Systems Ltd. (Bolton, Canada), BOY Machines Inc. (Exton, Pa.) and others.

Figure 3:
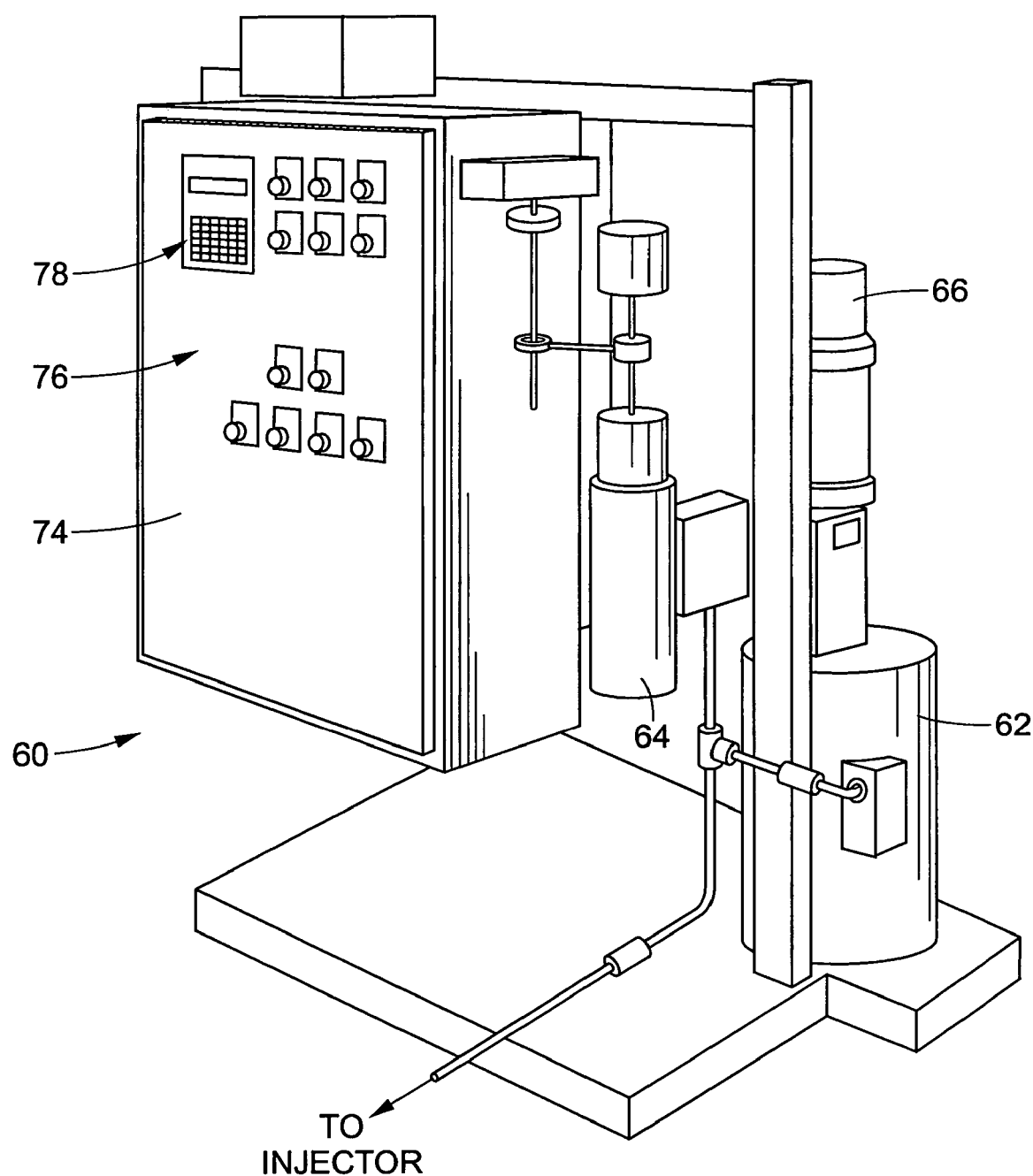
FIG. 3 is a perspective view of an in-mold coating apparatus adapted to be connected to the molding apparatus of FIG. 1.

FIG. 3 shows an IMC dispense and control apparatus 60 adapted to be connected to the molding apparatus 10 and provide IMC capabilities and controls therefor to the molding apparatus. The control apparatus 60 includes an IMC container receiving cylinder 62 for holding an IMC container such as a vat of an IMC composition. Suitable IMC compositions include those disclosed in U.S. Pat. No. 5,777,053. The control apparatus 60 further includes a metering cylinder or tube 64 that is adapted to be in fluid communication with the IMC container when received in the receiving cylinder 62. A transfer pump 66 is provided on the control apparatus 60 and is capable of pumping IMC composition from the receiving container 62 to metering cylinder 64.

The metering cylinder 64 is selectively fluidly connectable to the second injector 32 on the molding apparatus 10. The metering cylinder 64 includes a hydraulic means such as a piston for evacuating IMC composition from the metering cylinder 64 and directing it to the second injector 32. A return line (not shown) is connected to the second injector 32 and to the receiving container 62 to fluidly communicate therebetween.

The control apparatus 60 further includes an electrical box 74 capable of being connected to a power source. The electrical box 74 includes a plurality of controls 76 and a touch pad or other type of controller 78 thereon for controlling the dispensing of IMC composition to the mold cavity 16. A compressed air connector (not shown) is provided for connecting the apparatus 60 to a conventional compressed air line. Compressed air is used to drive the transfer pump 66 and remove IMC from the control apparatus 60 and its fluid communication lines during a cleaning operation. Additionally, air can be used to move solvent through the communication lines for cleaning purposes.

The dispense and control apparatus 60 may include a remote transmitter (not shown) adapted to be positioned, in preferred embodiment, on one of the mold halves 12,14. The transmitter may be, for example, a conventional rocker switch that sends a signal to the apparatus 60 upon actuation. The transmitter may be positioned on one of the mold halves 12,14 such that it is actuated upon closure of the mold halves 12,14. The signal sent from the transmitter is used to initiate a timer (not shown) on the control apparatus 60.

Alternatively, the molding apparatus 10 may be equipped with a transmitter or transmitting means that has the ability to generate a signal upon closure of the mold halves 12,14. A conventional signal transfer cable can be connected between the molding apparatus 10 and the control apparatus 60 for communicating the signal to the control apparatus 60. Such an arrangement eliminates the need for an independent transmitter to be connected to one of the mold halves 12,14.

Alternatively or in addition to the transmitter, the control apparatus 60 may include at least one remote sensor (not shown) adapted to be positioned on one of the mold halves 12,14 or otherwise adjacent to the mold cavity 16 to record or measure the internal pressure and/or temperature within the mold cavity 16. This sensor can be any known type of such sensor including, for example, a pressure transducer, thermocouple, etc. The sensor(s) and the control apparatus 60 are operatively connected via conventional means to allow measurement signals to pass therebetween.

To prepare for injection of IMC composition into the mold cavity, a container of a desired IMC composition is placed in the receiving cylinder 62. The metering cylinder 64 is connected to the second injector 32. A return line (not shown) is connected to the second injector 32 and the receiving cylinder 62. The control apparatus 60 is connected to a suitable power source such as a conventional 460 volt AC or DC electrical outlet to provide power to an electrical box (not shown). The remote sensor is appropriately positioned on one of the mold halves 12,14 as described above.

To make an in-mold coated article, a first composition is placed in the hopper 44 of the molding apparatus 10. The first injector 30 is moved into nesting or mating relation with the fixed mold half 12. Through conventional means, i.e., using the heated extruder barrel 48 and the rotating screw 46, the first injector 30 heats the first composition above its melting point and directs the heated first composition toward the nozzle 42 of the first injector 30. The mold halves 12,14 are closed thereby creating the mold cavity 16. The transmitter, if present, is positioned on one of the mold halves 12,14 such that, when they are closed, the transmitter sends a signal to control apparatus 80 indicating that the mold halves 12,14 are closed and that the molding process has begun. Upon receipt of this signal, hereinafter referred to as $T_0$, the control apparatus 80 initiates the timer contained therein, which tracks elapsed time from $T_0$. At predetermined elapsed time intervals, the control apparatus 80 actuates and controls various IMC related functions to ensure that the IMC composition is delivered to the mold cavity 16 at a desired point in the molding process. Thus, the control apparatus 80 operates concomitantly with molding apparatus 10.

After $T_0$, the molding process continues and a nozzle valve (not shown) of the nozzle 42 is moved to an open position for a predetermined amount of time to allow a corresponding quantity of the first thermoplastic composition to enter the mold cavity 16 through the orifice 38. The screw 46 provides a force or pressure that urges the first composition into the mold cavity 16 until the nozzle valve returns to its closed position. The first composition fills the mold cavity 16. Once the mold cavity 16 is filled and packed, the first composition is allowed to cool to a temperature below its melting point. The first composition does not cool uniformly, with the material that constitutes the interior of the molded article generally remaining molten while the material that constitutes the surface begins to harden as it cools more quickly.

After injection, the resin in the mold cavity 16 begins to solidify, at least to an extent such that the substrate can withstand injection and/or flow pressure subsequently created by introduction of the coating composition. During this solidification, the forming article cools somewhat, and this is believed to result in at least a slight shrinkage, i.e., a small gap between the forming article and the surfaces 34 and 36. Clearly, some type of active movement of the surfaces 34 and 36 from the forming article could be undertaken but has not proven necessary. A predetermined amount of coating composition is utilized so as to provide a coating having, for example, a desired thickness and density.

As described above, allowing the surface of the substrate to sufficiently cool and harden such that the IMC composition and the first composition do not excessively intermingle. Also, the longer the time period between the end of the first composition filling and the coating injection, generally the lower the packing pressure needed to inject the coating composition and the easier the injection. However, because the IMC composition generally relies on the residual heat of the cooling article to cure, one risks inadequate curing of the IMC composition if the waiting period is too long. In addition, the article-forming material needs to remain sufficiently molten both to allow for sufficient adhesion between the IMC and the substrate as well as to provide sufficient compressibility to allow adequate flow of the IMC around the surface of the substrate in the mold. Thus, the ease of coating injection needs to be balanced with the need for sufficient residual heat to obtain an adequate curing of the IMC composition.

After the first composition has been injected into mold cavity 16 and the surface of the molded article to be coated has cooled below the melt point or otherwise reached a temperature or modulus sufficient to accept or support a coating composition but before the surface has cooled so much that curing of the IMC composition is inhibited, a predetermined amount of an IMC composition is ready to be introduced into the mold cavity from the orifice 40 (FIG. 2) of the second composition injector 32.

The point in the molding process when the IMC composition is injected, hereinafter referred to as $T_{IMC}$, can be characterized as an elapsed time from $T_0$. For the second injector 32 to inject the IMC composition precisely at $T_{IMC}$, the control apparatus 60 must perform several functions at precise times between $T_0$ and $T_{IMC}$. Each of these functions occurs at a predetermined elapsed time relative to $T_0$. One such function is filling metering cylinder 84 with a desired amount of IMC composition. This function occurs in advance of $T_{IMC}$. Thus, at the preselected elapsed time, the control apparatus 60 opens a valve (not shown) that permits fluid communication between the IMC composition-filled container and metering cylinder 64. The transfer pump 66 then pumps coating composition from the container to the metering cylinder 64. When the metering cylinder 64 is filled a desired amount, the valve closes to prevent more IMC from entering the cylinder 64. The amount of IMC composition permitted to enter the cylinder 64 is selectively adjustable.

After the cylinder 64 is filled and just prior to $T_{IMC}$, the control apparatus 60 opens a pin or valve (not shown) on second injector 32 to allow fluid communication between the second injector 32 and the mold cavity 16. The valve is normally biased or urged toward a closed position, i.e., flush to the mold surface, but is selectively movable toward the open position by the control apparatus 60. Specifically, for example, an electrically powered hydraulic pump (not shown) of the control apparatus 60 is used to move the valve. Immediately or very shortly thereafter, at $T_{IMC}$, the hydraulic means of the cylinder 64 evacuates the IMC composition contained therein and delivers it to second injector 32 where it passes through orifice 40 and into mold cavity 16.

The IMC composition is injected into the mold cavity at a pressure ranging generally from about 3.5 to about 35 MPa, desirably from about 10 to about 31 MPa, and preferably from about 13.5 to about 28 MPa.

Once coating composition has been injected into the mold cavity 16, the second injector 32 is deactivated, thus causing flow of coating composition to cease. The coating composition flows around the molded article and adheres to its surface. Curing or crosslinking of the coating composition can be caused by the residual heat of the substrate and/or mold halves, or by reaction of the composition components. The coating composition subsequently cures in the mold cavity and adheres to the substrate surface, thus forming a coating thereon. If the residual heat of the substrate is used to effect curing, the IMC composition is injected before the molded article has cooled to the point below where proper curing of the coating can be achieved. The IMC composition requires a minimum temperature to activate the catalyst or initiator present therein which causes a cross-linking reaction to occur, thereby curing and bonding the coating to the substrate.

As detailed above, the IMC composition preferably is injected soon after the surface of the molded article has cooled enough to reach its melt temperature. The determination of when the melt temperature is reached can be determined from time elapsed from $T_0$ based on results from previous trials using the same materials and mold conditions. This point can also be determined indirectly by observation of the internal mold pressure. As noted, when the molded part cools to its melt temperature and begins to solidify, it contracts somewhat, thus reducing the pressure in the mold, which may recorded through the use of a pressure transducer (not shown) in the mold.

In the above described process, the mold is generally not opened or unclamped before the IMC is applied. That is, the mold halves maintain a parting line and generally remain substantially fixed relative to each other while both the first and second compositions are injected into the mold cavity. The IMC composition spreads out from the mold surface and coats a predetermined portion or area of the molded article. Immediately or very shortly after the IMC composition is fully injected into the mold cavity 16, the nozzle valve or deactivation means of the second injector 32 is engaged, thereby preventing further injection of IMC composition into the mold cavity 16.

IMCs are generally flexible and can be utilized on a variety of injection molded substrates, including thermoplastics and thermosets. Thermoplastic molding resins which can be used to make articles capable of being coated by means of the foregoing composition include acrylonitrile-butadiene-styrene (ABS), phenolics, polycarbonate (PC), thermoplastic polyesters, polyolefins including polyolefin copolymers and polyolefin blends, PVC, epoxies, silicones, and similar thermoplastic resins, as well as alloys of such molding-resins. Preferred thermoplastic resins include PC and PC alloys, ABS, and alloy mixtures of PC/ABS. Exemplary useful alloy mixtures of PC/ABS ordinarily have a PC/ABS ratio of about 20/80 by weight.

Between IMC injections, the control apparatus 60 uses the transfer pump 66 to circulate IMC composition through the system. The valve on the second injector 32 remains in its closed position thereby preventing any IMC composition from entering the mold cavity 16. One purpose of circulating the IMC composition between cycles is to prevent any particular portion of the coating composition from becoming undesirably heated due to its proximity to heating mechanisms on the molding apparatus 10. Such heating could detrimentally impact the material properties of the IMC or could solidify the IMC composition in the fluid lines.

The control apparatus 60 includes a set of controls 66 and a keypad 68 to enable an operator to adjust and/or set certain operating parameters of the control apparatus 60. For example, the controls can be manipulated to increase or decrease the amount of IMC composition to be filled in the cylinder 64 by allowing the valve that controls communication between the cylinder 64 and the receiving container 62 to remain open for a longer duration. Additionally, the controls can be manipulated to adjust the elapsed time from $T_0$ that the cylinder 64 is filled by transfer pump 66 and/or the amount of time elapsed from $T_0$ that the cylinder 64 is emptied by the hydraulic means. This time may be adjusted to more closely approximate $T_{IMC}$.

In an alterative embodiment, and as mentioned above, the sensor is a pressure transducer mounted adjacent the mold cavity 16 and adapted to record a pressure in the mold cavity 16. In this embodiment, the transmitter and timer of the control apparatus 60 can be eliminated. Rather than using the time elapsed from $T_0$ to dictate when the mold processes are begun, in this embodiment the control apparatus 60 injects IMC composition into the mold cavity 16 based on the pressure recorded in the mold cavity 16 by the pressure transducer sensor. The IMC composition is desirably injected into the mold cavity at the same point in the molding process, $T_{IMC}$, irrespective of what type of sensor is used. Thus, rather than being time dependent, this embodiment is pressure dependent.

Such control is possible because pressure in mold cavity 16 initially rises as molding resin fills mold cavity. The pressure rises more as the mold cavity is packed. Finally, the pressure in mold cavity 16 begins to decrease as the molded article cools and begins to solidify. At a predetermined pressure during the cooling phase that corresponds with $T_{IMC}$, the IMC composition is preferably injected into the mold cavity 16. The predetermined pressure is generally based on the specific type of resin used and may also be based on the specific type of IMC composition used.

Based on pressure measurements taken by the pressure transducer sensor, the series of functions performed by the control apparatus 60 also can be dependent on the pressure measured in the mold cavity 16. Thus, each of the functions can occur at a predetermined pressure in the mold cavity 16 so that the IMC composition can be injected into the mold cavity 16 at the desired point in the molding process. Injecting IMC composition into the mold cavity 16 onto the surface of a molded article based on the pressure measured in the mold cavity is generally described in U.S. Pat. No. 6,617,033.

The term "transducer" is meant to cover any type of sensor or other means for measuring or recording a value for an associated variable. Thus, a pressure transducer alternatively can be a plurality of pressure sensors positioned at varying locations around the mold cavity 16. In this arrangement, control apparatus 80 would perform its functions, including injecting the IMC composition, based on a plurality of pressure measurements. For example, the control apparatus 80 could perform its functions based on predetermined averages of the plurality of pressure measurements taken by the sensors. This arrangement may be desirable because a plurality of pressure transducers may be able to better determine the actual pressure observed in the mold cavity 16.

Alternatively or in addition to the previous embodiments, a temperature sensor can be used to determine when to inject the IMC composition. That is, once the temperature mold cavity 16 reaches a temperature below the known melt temperature of the material being used, the IMC composition can be injected.

Figure 4:
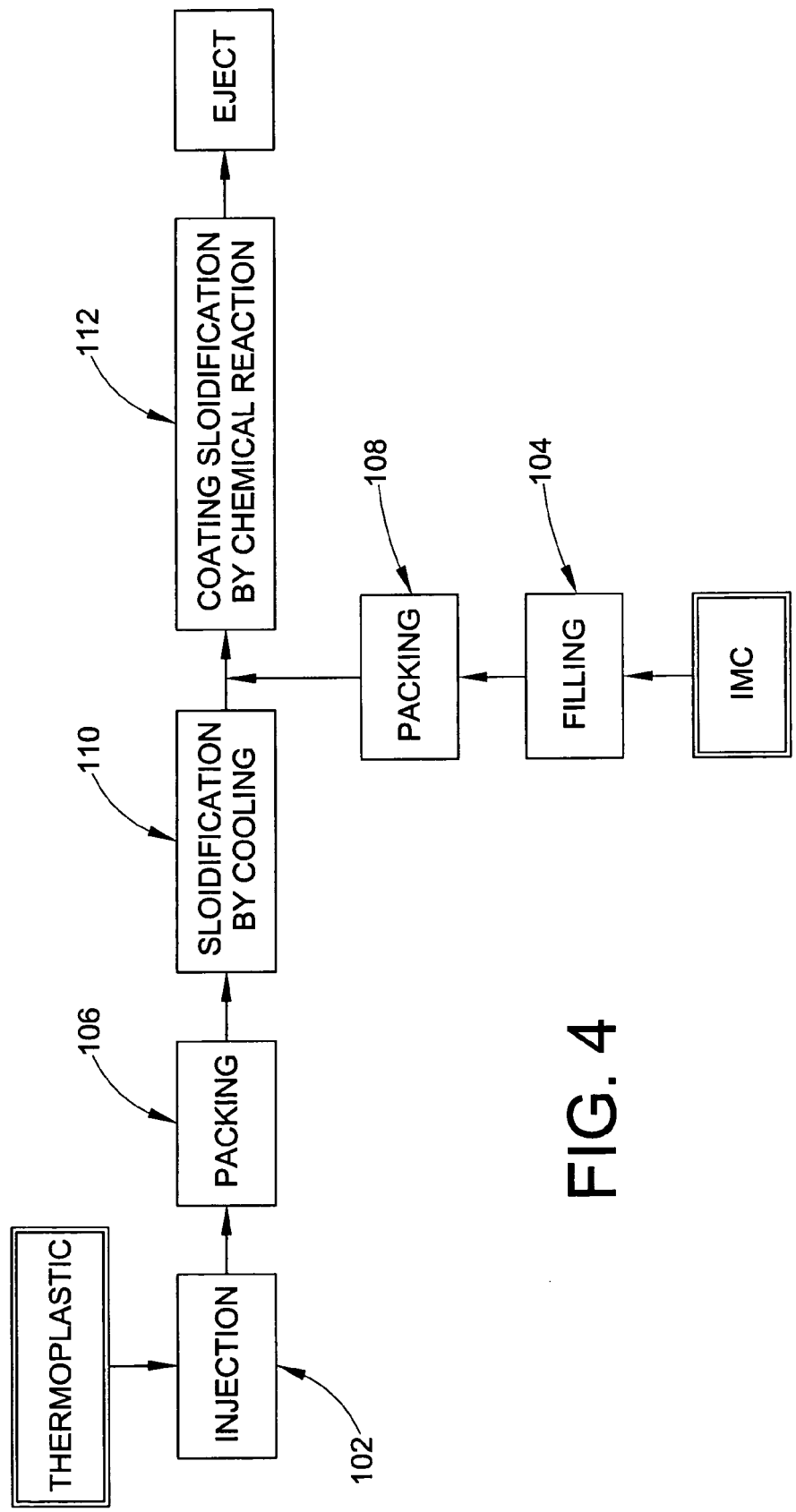
FIG. 4 is a flow chart showing a typical thermoplastic molding and IMC injection cycle.

With reference to FIG. 4, the injection molding cycle for a thermoplastic and the coating cycle for an IMC can both generally be thought of as including three main stages: injection (or filling) 102 and 104, packing 106 and 108 and solidification that is due to cooling for the thermoplastic molding 110, and curing for the IMC 112. The coating material is injected 104 into the mold while the thermoplastic is in the solidification stage 110. As the coating is injected into the mold under high pressure, it flows around the interior walls of the mold by compressing the thermoplastic substrate until the exterior surface of the thermoplastic substrate is completely covered. In order to obtain a desired coating thickness, more coating material is injected into the mold during the packing phase 108. The IMC solidifies during the curing stage 112. The IMC systems and processes described thus far are generally known to those in the industry.

A key to optimizing the IMC process is to be able to predict the fill pattern of the IMC and coating pressure distribution, so as to locate the injection nozzle or nozzles in locations where the potential for surface defects in the appearance region of the part are minimized while decreasing the time for complete flow coverage of the IMC over the thermoplastic substrate. Thus, the present invention presents an improvement to the IMC process by providing a method of predicting the fill pattern and coating pressure distribution of the IMC and using this pattern to determine the most beneficial placement of the IMC injection nozzle(s) in the mold. The mathematical modeling for the method of the present invention is set forth below.

Generally, the coating thickness is very small as compared to the dimensions in the other two directions. Therefore, the generalized Hele-Shaw model may be applied to model the two-dimensional IMC flow. In addition, it is assumed that the IMC flow is isothermal and that there is no chemical reaction during flow because enough inhibitor has been added to the coating.

The governing equations are:

$$\frac{\partial(h\bar{v}_x)}{\partial x} + \frac{\partial(h\bar{v}_y)}{\partial y} = -\frac{dh}{dt} \tag{1}$$

where $\bar{v}_x$ and $\bar{v}_y$ are the thickness averaged velocities respectively in the x and y directions:

$$\bar{v}_x = -\frac{S}{h}\frac{\partial p}{\partial x} \tag{2}$$

$$\bar{v}_y = -\frac{S}{h}\frac{\partial p}{\partial y} \tag{3}$$

where, $$S(x,y) = \int_0^h \frac{z^2}{\eta(x,y,z)} dz \tag{4}$$

In the above equations, h is the thickness change of the thermoplastic substrate caused by the coating injection. It is represented by:

$$h = h_s(1 - V/V_0) \tag{5}$$

where:

$h_s$ is the original thickness of the substrate right before the IMC injection;

V is the specific volume of the substrate; and $V_0$ is the specific volume of the substrate right before the coating injection.

The compressibility of the substrate is described by the two-domain Tait PVT model. Under the isothermal assumption, specific volume is only a function of coating pressure:

$$V = f(p) \tag{6}$$

Preferably, a power-law model is used because it has been found experimentally that the power-law viscosity model can adequately predict the rheological behavior of the coating:

$$\eta = m\dot{\gamma}^{n-1} \tag{7}$$

Figure 5:
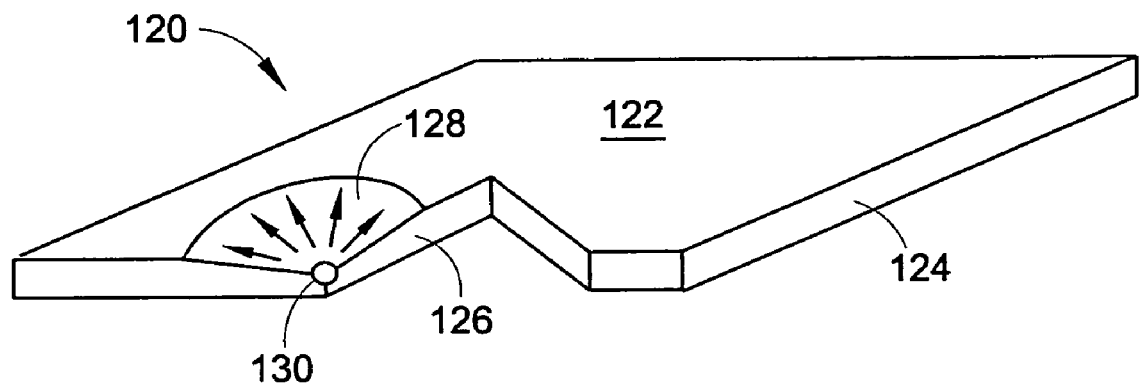
FIG. 5 is a partly cross-sectional view of a part showing the different boundaries surrounding the two-dimensional (2D) IMC flow domain.

There may be five different kinds of boundaries surrounding the 2D IMC flow domain, as illustrated in FIG. 5. For a thermoplastic substrate 120, at the top mold walls 122, a non-slip boundary condition is applied. At the side mold walls 124, a non-leakage boundary condition is applied. On the top surface 126 of the thermoplastic substrate 120, a non-slip boundary condition is applied. The thickness change of the substrate 120 is a function of pressure. At the flow front 128, in the filling stage, the pressure at the flow front equals the pressure of thermoplastic substrate 120 at this position. At the inlet 130, the flow rate at the inlet is constant during IMC flow.

The finite element method is known as an approximation method used in areas such as structural mechanics, electrical field theory and fluid mechanics for studying continuous physical systems. In the finite element method, a three-dimensional model to be analyzed is segmented into a plurality of small parts (finite elements) and functions of the individual elements are approximated to obtain a target algebraic equation. The Control Volume/Finite Element Method (CV/FEM) has been widely used in computer simulations for Resin Transfer Molding (RTM) and other polymer processes. Preferably, the CV/FEM is used here to solve the 2D IMC filling equations.

The present invention has been developed based on a finite element mesh of the flow domain. The mesh may be created by any known type of mesh generation software, such Tecplot, available from Tecplot, Inc. of Bellevue, Wash., or IDEAS, available from SDRC of Milford, Ohio.

Figure 6:
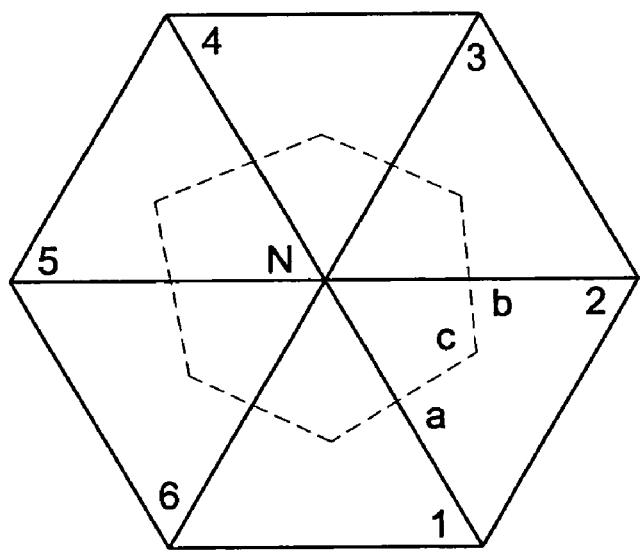
FIG. 6 depicts the projection area of a control volume that is associated with an arbitrary node N on the laminar flow plane.

The boundary of the control volume of a node is constructed by connecting the centroids of all the surrounding elements of that node through the midpoints of all the element edges which contain that particular node. The projection area of a control volume that is associated with an arbitrary node N on the laminar flow plane is shown in FIG. 6. The numerals 1-6 represent that, for this particular node N, there are six surrounding elements. The dashed lines represent the boundary of the control volume. To better illustrate the way to construct the boundary of the control volume, a segment acb of the control volume boundary is shown in element 2. In element 2, points a and b are the midpoints of the element edges that contain node N, and c is the centroid of the element.

Figure 7:
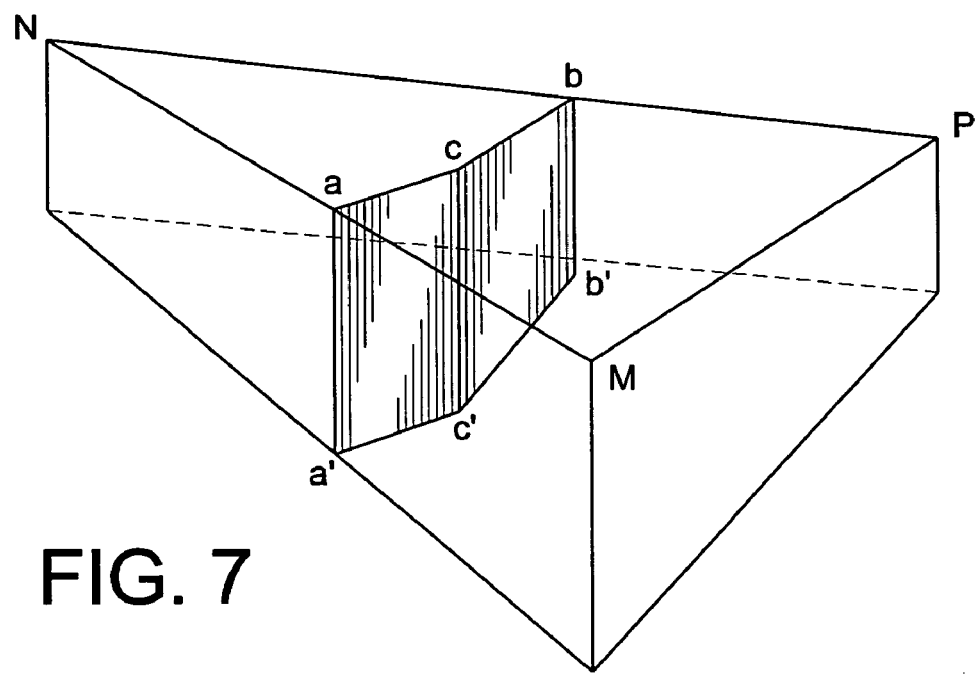
FIG. 7 represents a control volume of an arbitrary node N in one of its surrounding elements.

FIG. 7 represents a control volume of an arbitrary node N in one of its surrounding elements, where M and P are the other two nodes of that element. The shaded areas in FIG. 7 represent the boundary surfaces of the control volume. Based on the mass conservation on a control volume, the discrete form of the governing equation is:

$$\sum_{i=1}^{e} \frac{3\Lambda^{\frac{1}{n}-1}}{2^{\frac{1}{n}}\left(2+\frac{1}{n}\right)A_i m^{\frac{1}{n}}} \left( \frac{l_{ac}}{\frac{1}{n}+4} \frac{h_c^{\frac{1}{n}+4} - h_a^{\frac{1}{n}+4}}{h_c - h_a}, \frac{l_{bc}}{\frac{1}{n}+4} \frac{h_c^{\frac{1}{n}+4} - h_b^{\frac{1}{n}+4}}{h_c - h_b} \right)_i \begin{bmatrix} \beta_1 & \beta_2 & \beta_3 \\ \gamma_1 & \gamma_2 & \gamma_3 \end{bmatrix}_i \tag{8}$$

-continued $$\begin{bmatrix} p_1 \\ p_2 \\ p_3 \end{bmatrix}_i = \frac{1}{\Delta t} \sum_{i=1}^{e} \left\{ \begin{pmatrix} [(h_N^{(t)} + h_c^{(t)})^2 + (h_N^{(t)} + h_a^{(t)})^2 + \\ (h_a^{(t)} + h_c^{(t)})^2]A_{\Delta Nac} + \\ [(h_N^{(t)} + h_c^{(t)})^2 + (h_N^{(t)} + h_b^{(t)})^2 + \\ (h_b^{(t)} + h_c^{(t)})^2]A_{\Delta Nbc} \end{pmatrix} \right\}_i -$$

$$\frac{1}{\Delta t} \sum_{i=1}^{e} \left\{ \begin{pmatrix} [(h_N^{(t-\Delta t)} + h_c^{(t-\Delta t)})^2 + (h_N^{(t-\Delta t)} + h_a^{(t-\Delta t)})^2 + \\ (h_a^{(t-\Delta t)} + h_c^{(t-\Delta t)})^2]A_{\Delta Nac} + \\ [(h_N^{(t-\Delta t)} + h_c^{(t-\Delta t)})^2 + (h_N^{(t-\Delta t)} + h_b^{(t-\Delta t)})^2 + \\ (h_b^{(t-\Delta t)} + h_c^{(t-\Delta t)})^2]A_{\Delta Nbc} \end{pmatrix} \right\}_i$$

where:

$I_{ac}$ and $I_{bc}$ are, respectively, the length of lines as and bc in FIG. 7;

h with different subscripts N, a, b and c, respectively, represents the thickness changes of the substrate at different locations, which are correspondingly shown in FIG. 7 as points N, a, b and c; and superscript t represents the current time and t−Δt represents the subtraction of the current time and the calculated time step.

Thus, different from conventional injection molding, for in-mold coating integrated injection molding, the thickness change of the substrate is not only the function of space, but also the function of time.

Figure 8:
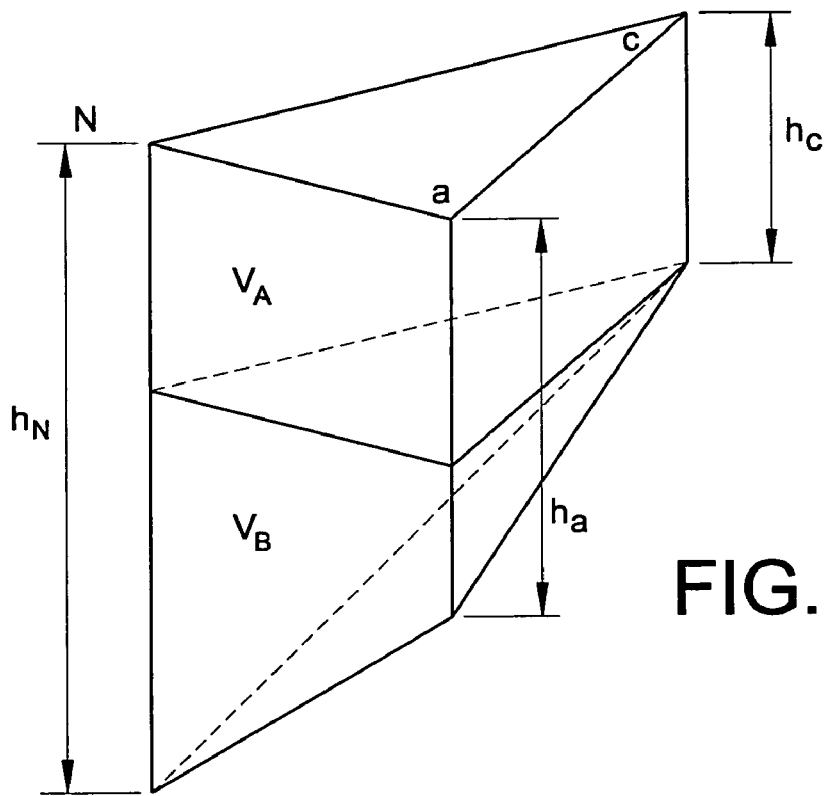
FIG. 8 depicts the 3D view of a portion of the control volume of an arbitrary node N.

To better explain the way to calculate the volume of a control volume, a portion of the control volume with in-plane vertices N, a, c and b, as shown in FIG. 6, is extracted and divided into two parts: $V_i$ with in-plane vertices N, a and c and $V_j$ with in-plane vertices N, c and b. The three dimensional (3D) view of $V_i$ is shown in FIG. 8. That portion of the control volume $V_i$ can be further divided into two sections, $V_A$ and $V_B$, of which the volumes are very easy to calculate, as known in the art. The same process is applied to calculate $V_j$. The total control volume of node N is:

$$V_{total} = \sum_{i,j=1}^{e} [V_i + V_j] \qquad (9)$$

$$= \sum_{m=1}^{e} \left[ \frac{1}{3}(h_a + h_c + h_N)S_{\Delta Nac} + \frac{1}{3}(h_b + h_c + h_N)S_{\Delta Ncb} \right]_m$$

where e is the total number of elements surrounding node N.

Figure 9:
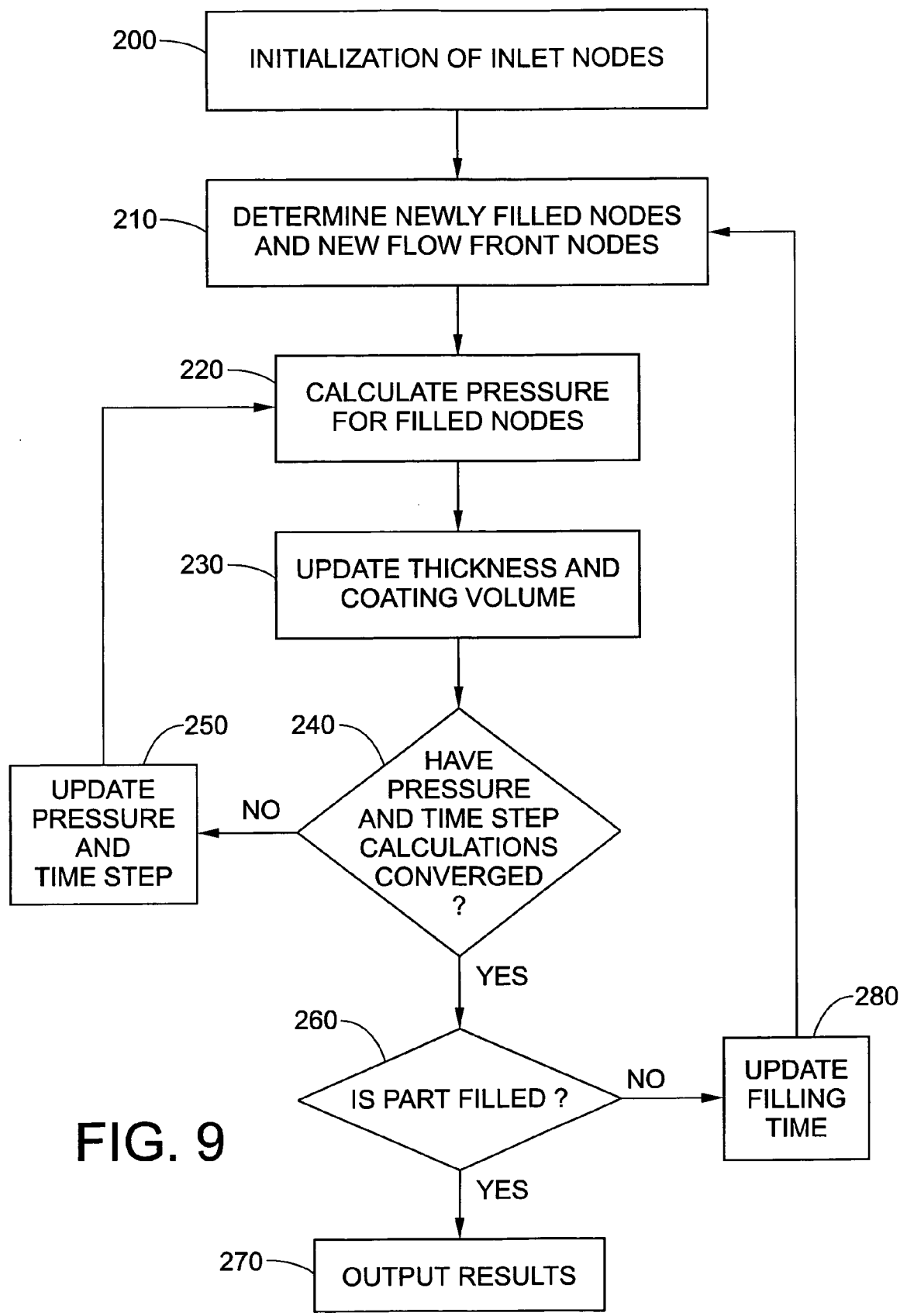
FIG. 9 is a flow chart showing an embodiment of the present invention.
Figure 10:
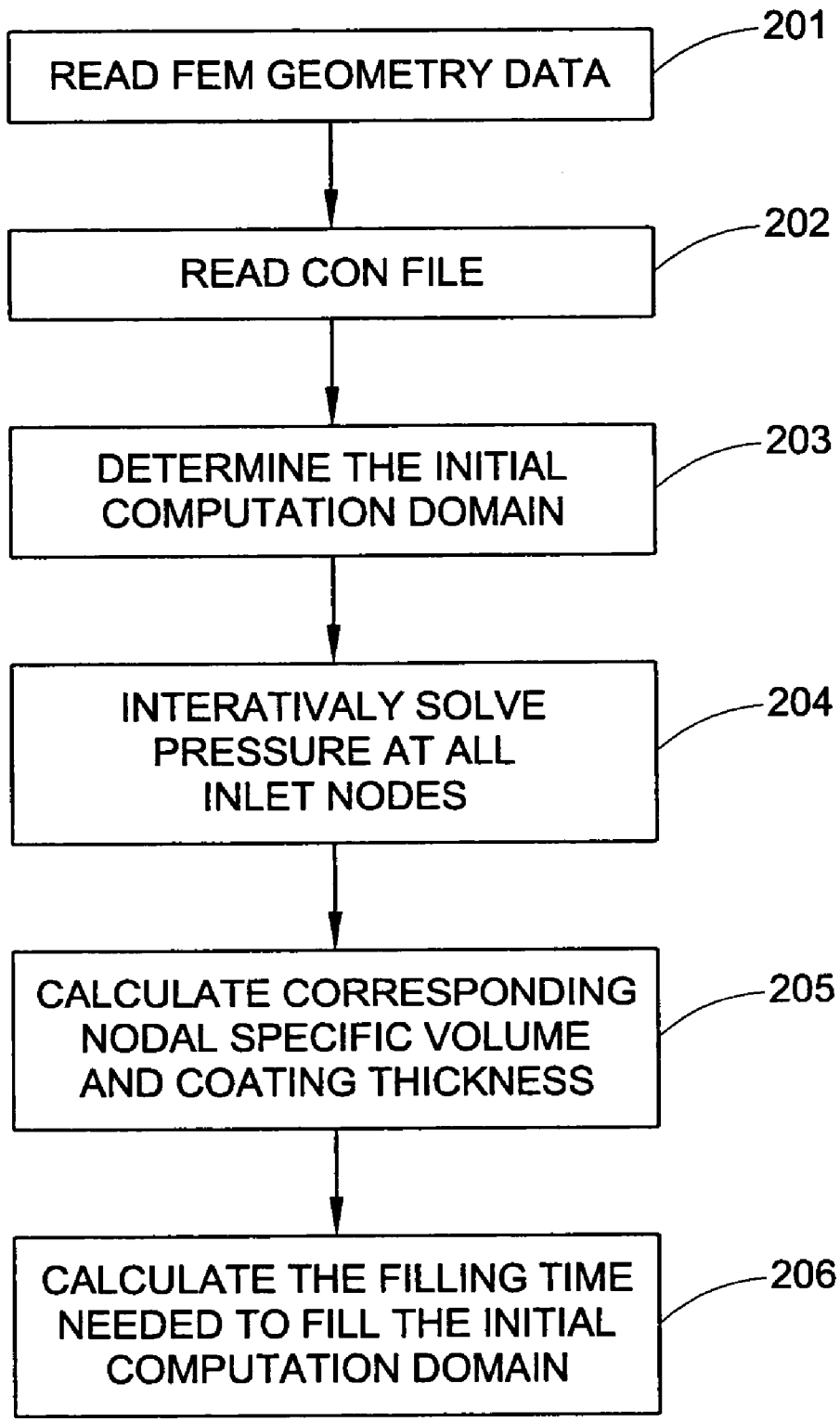
FIG. 10 is a flow chart showing an embodiment of the present invention.

A computer program based upon the CV/FEM method has been developed to solve the 2D IMC flow. A flow chart of an embodiment of the method of the present invention is shown in FIG. 9. In step 200, the pressure for the inlet nodes and the thickness changing of the substrate for the inlet nodes are initialized. Preferably, this step further includes the sub-steps shown in FIG. 10. The first two sub-steps involve inputting the initial parameters. Thus, in step 201, the FEM geometry data is read. The FEM geometry data is stored in a text file, which includes all the CAD model-related finite element mesh information, including node coordinates, element connectivity and element property. Next, a CON file is read (step 202). The CON file is a text file which includes the processing conditions required for the flow calculation, inlet node number, and convergence criteria of the calculation. All of the information in these two files will be necessary in order to run the analysis.

In step 203, the initial computation domain is defined as the control volumes of all the inlet nodes, where it is assumed that all of the control volumes have been filled completely. The control volume as illustrated in FIG. 6 is thus constructed. All the empty nodes of which the control volumes have not been reached by the melt around the inlet nodes are defined as the flow front nodes. The pressures at all the inlet nodes are iteratively calculated based on equation (8) (step 204). Then, the corresponding nodal specific volume and coating thickness can be calculated based on equations (5) and (6) (step 205). The filling time needed to fill the initial computation domain is also calculated in step 206.

Returning now to the main flow chart of FIG. 9, in step 210, the newly filled nodes and the new flow front nodes are determined. In each time step, only one control volume of the flow front nodes is allowed to be filled completely. And, therefore, that particular flow front node turns into a newly filled node. The nodes surrounding the newly filled node, which are originally empty nodes, become the new flow front nodes. In this way, the flow front moves forward. Preferably, step 210 further includes the sub-steps shown in FIG. 11.

Figure 11:
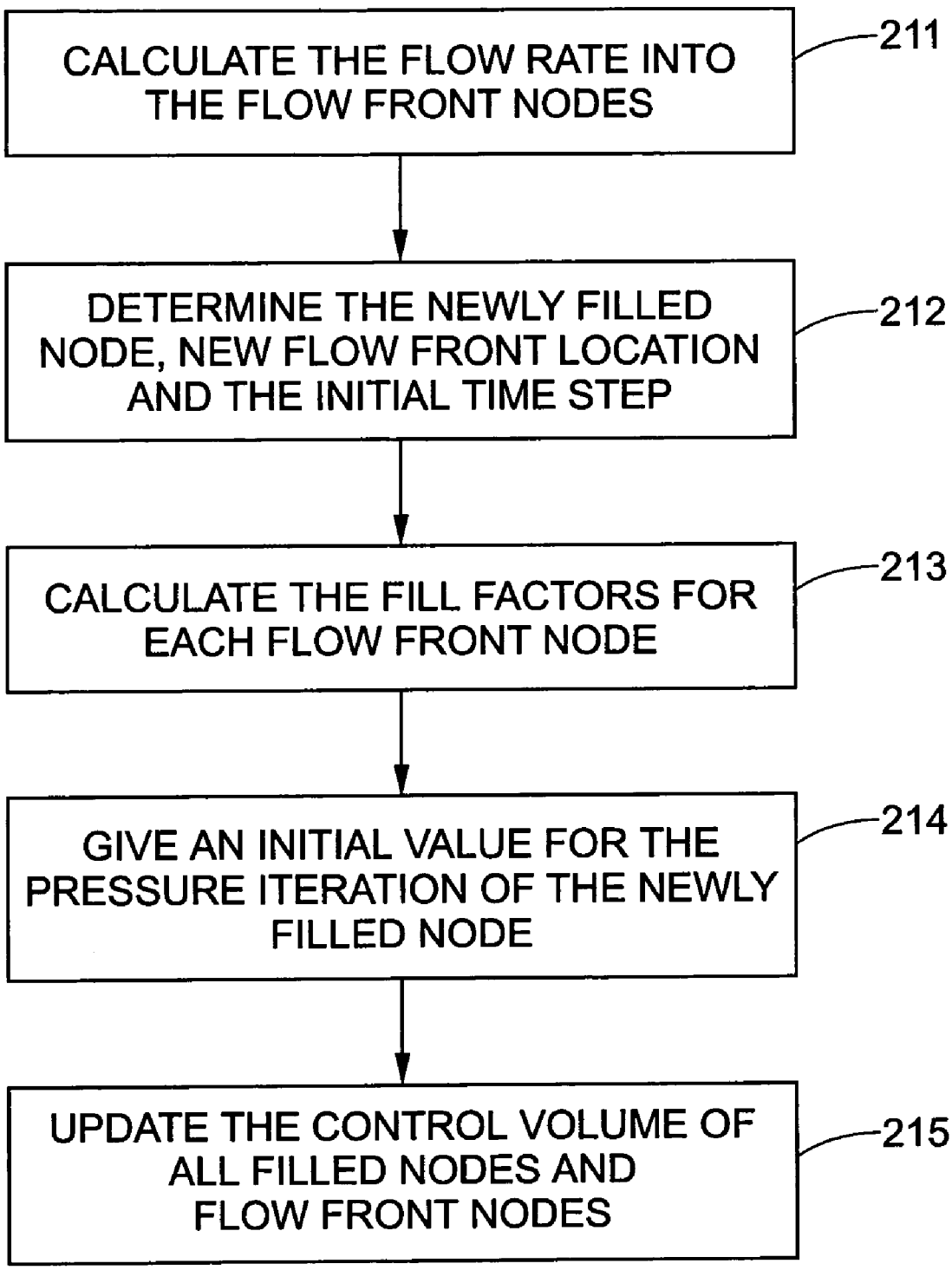
FIG. 11 is a flow chart showing an embodiment of the present invention.

Thus, as shown in FIG. 11, the flow rate into each flow front node is calculated in step 211. In step 212, the time increment is calculated for each flow front node by dividing the control volume of that node by the corresponding flow rate. The initial time step would be the minimum value of all the time increments. And that particular flow front node of which the corresponding time increment needs to be filled up to its control volume is the minimum one and would be the newly filled node. All the empty nodes around that newly filled node turn into the new flow front nodes. Therefore, the new flow front location is updated. In step 213, the fill factor f for each of the flow front nodes is calculated. Fill factor f is a dimensionless scalar. For an empty control volume, f is always equal to 0. For a completely filled control volume, f is equal to 1. For a partially filled control volume, the control volume of the flow front node equals the flow rate into that control volume times the time step, divided by the total volume of the control volume. In step 214, a pressure value for the newly filled node is assigned as the initial value for the subsequent pressure iteration. Correspondingly, the control volume for all the filled nodes and flow front nodes needs to be updated (step 215).

Returning now to the main flow chart of FIG. 9, once the newly filled node is determined, the pressure and thickness change of the substrate at each filled node, as well as the time step, are calculated in loops (steps 220 and 230). Because of the non-linear relationship between the thickness change of the substrate, h, and the coating injection pressure, p, two non-linear iterative loops—one for pressure iteration and another one for time step iteration—are executed in the computer code. Besides updating pressure p and thickness change of the substrate h within each iteration, the control volume of each filled node and the rate of the control volume change are updated.

In step 240, an iterative process is said to have converged when further iterations will not improve the accuracy of the dependent variables. In practice, the iterative process is terminated when the desired accuracy is obtained. In this technique, a determination is made as to the convergence of both the pressure iteration and the time step iteration. The divergence of either iteration will lead to the updating of the pressure and the time step (step 250) and a return to step 220. Otherwise, a further determination is made as to whether the part is filled completely (step 260). If so, then the results are output (step 270), and the simulation is complete. Otherwise, the filling time is updated (t=t+Δt) (step 280), and step 210 is repeated.

Figure 12:
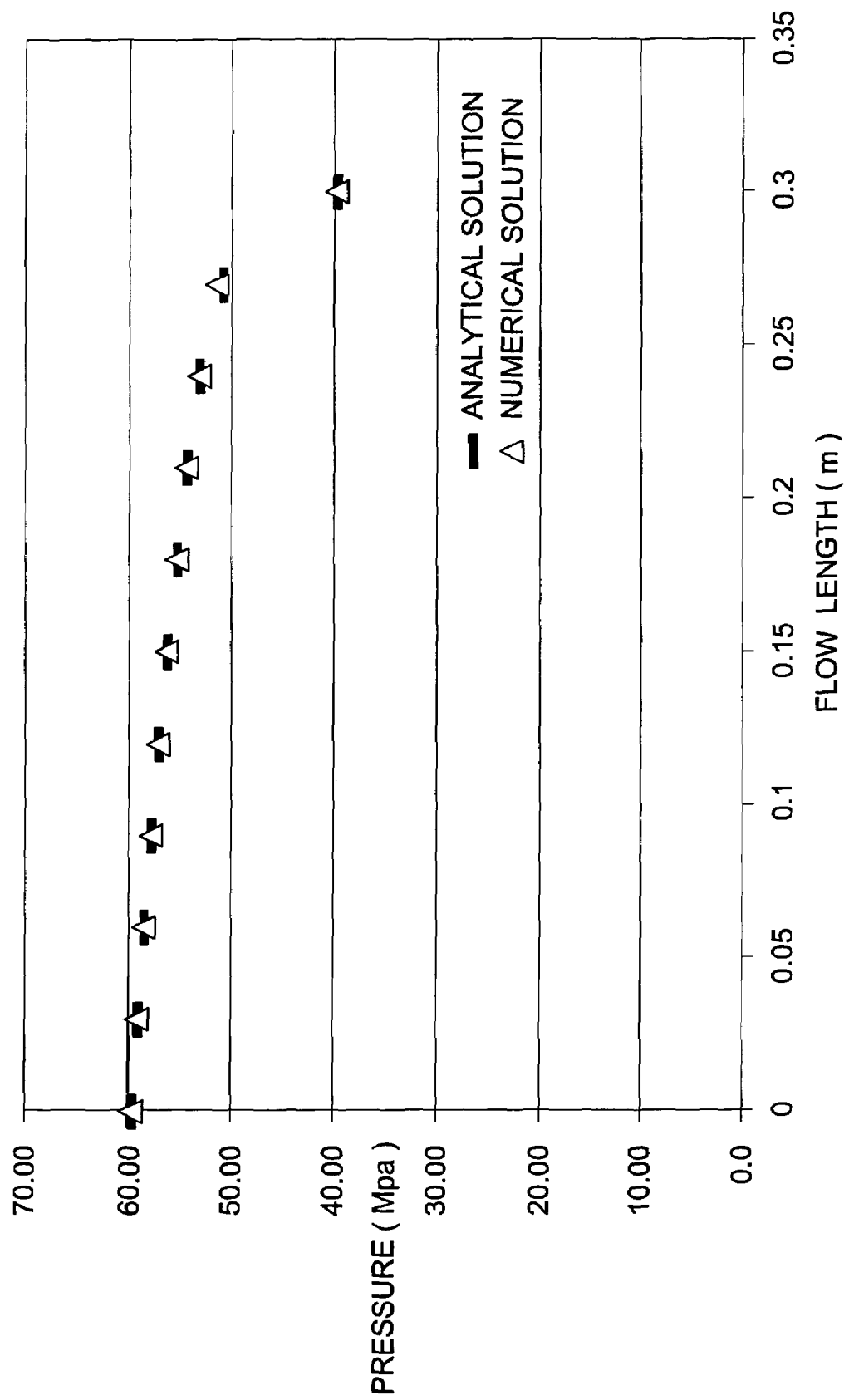
FIG. 12 is a chart comparing the analytically predicted injection pressure (via the equations) with the numerically predicted injection pressure (via the computer program).

The IMC flow in a rectangular part has been studied. In the sample study, the dimensions of the rectangular part were 0.3 m long×0.2 m wide×0.003 m thick. The flow rate of coating was $2.0 \times 10^{-7}$ m$^3$/s. If all the nodes along one edge of the 2D rectangular mesh are specified as inlet nodes, then a one dimensional (1D) flow pattern in the 2D computation domain may be obtained. The numerical solution of this specific 2D IMC filling case can be obtained via the computer simulation tool described above and verified by the analytical solution of the 1D IMC flow. The analytical solution for 1D IMC flow is obtained from the equations described above if a linear relationship between the substrate deformation and coating injection pressure is assumed. A comparison of the predicted injection pressure between the numerical solution and the analytical solution is shown in FIG. 12. It can be seen that the numerical solution agrees very well with the analytical solution.

In another sample study, IMC was applied to cover a flat plate with the different thicknesses of 0.003 m, 0.002 m and 0.0015 m. The dimensions of the square were 0.1524 m×0.1524 m. The flow rate of IMC was $2.0 \times 10^{-7}$ m$^3$/s. The pressure of the substrate at the time the injection of the coating started was 0.1 MPa. The computer code of the 2D IMC flow analysis was used to predict the IMC flow for this part. The predicted fill pattern, although it is quite close to the short shot, underpredicts the faster flow around mold walls. The faster flow of IMC around mold walls is very similar to the race tracking in RTM. It has been found that to predict this phenomenon, it may be necessary to assign a large thickness to the elements in contact with mold walls.

Figure 13:
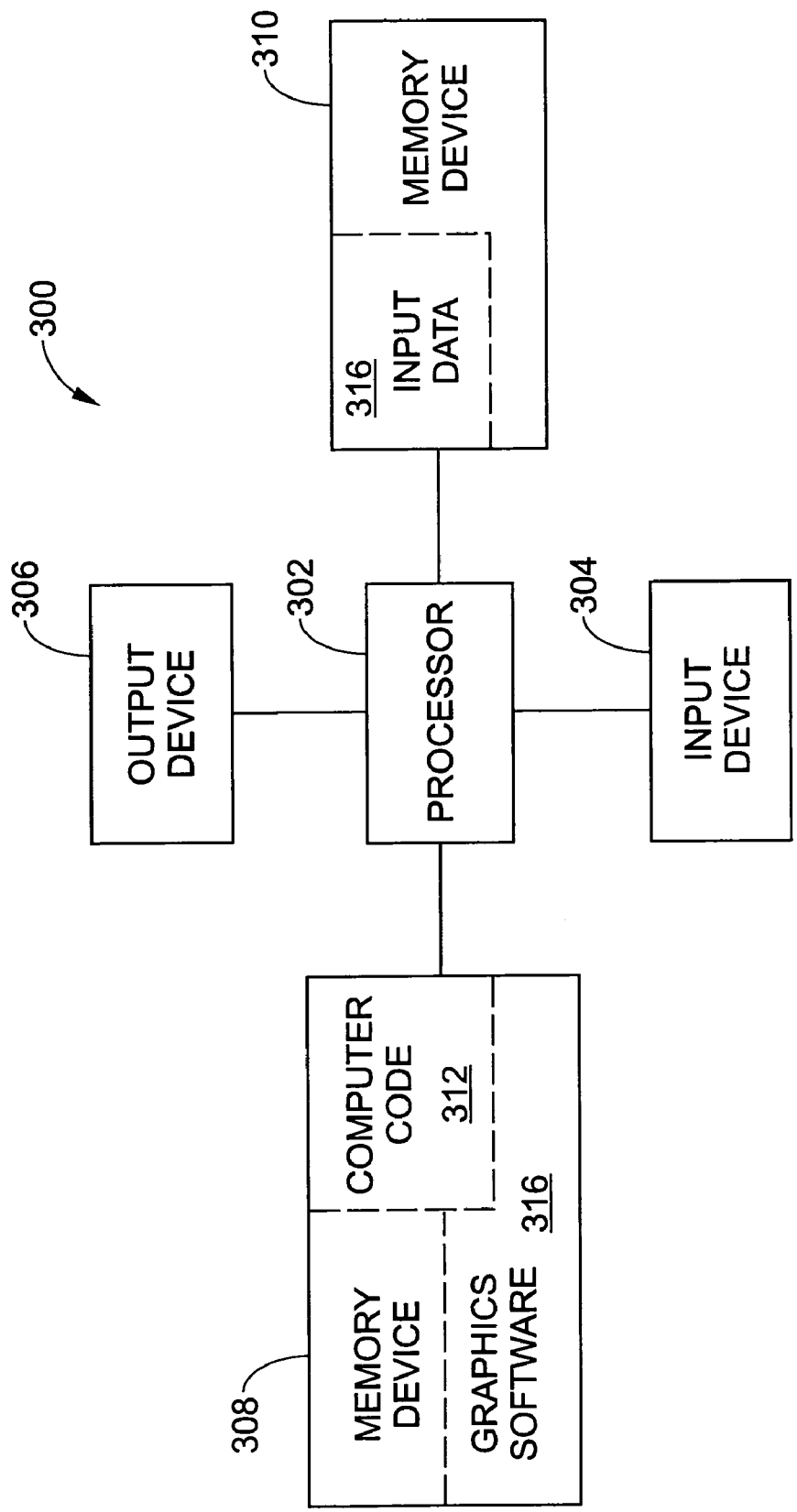
FIG. 13 depicts a block diagram of a computer system suitable for implementing aspects of the present invention.

The preferred embodiment of the present invention is designed to operate with a computer system. In this case, the contents of the processing functions to be accomplished are described in a program and recorded in a computer-readable recording medium so that by executing the program by the computer system, the above-described processing can be executed. In this regard, FIG. 13 illustrates a computer system 300 suitable for executing aspects of the present invention. The computer system 300 generally comprises a processor 302, an input device 304 coupled to the processor 302, an output device 306 coupled to the processor 302, and memory devices 308 and 310 each coupled to the processor 302. The input device 304 may be, for example, a keyboard, a mouse, etc. The output device 306 may be, for example, a printer, a plotter, a computer screen, a magnetic tape, a removable hard disk, a floppy disk, etc. The memory devices 308 and 310 may be, for example, a hard disk, a dynamic random access memory (DRAM), a read-only memory (ROM), etc. The memory device 308 includes computer code 312 and graphics software 314. The computer code 312 includes a calculational algorithm, for computing the 2D IMC flow, as described herein. The graphics software 314 may include an existing computer graphics design, or newly written computer graphics software. The computer code 312 and the graphics software 314 may be independent (as shown in FIG. 13) or coupled together such as in the newly written computer graphics software. The processor 302 executes the computer code 312 and the graphics software 314. The memory device 310 includes input data 316. The input data 316 includes input required by the computer code 312 and the graphics software 314, as described herein. The output device 306 displays output (such as the output described herein) from the computer code 312 and the graphics software 314.

While FIG. 13 shows the computer system 300 as a particular configuration of hardware and software, any configuration of hardware and software, as would be known to a person of ordinary skill in the art, may be utilized for the purposes stated above in conjunction with the particular computer system 300 of FIG. 13. For example, the memory devices 308 and 310 may be portions of a single memory device rather than separate memory devices.

To summarize, a mathematical model for 2D IMC flow, based on the generalized Hele-Shaw approximation has been developed. The power-law viscosity model is used to describe the rheological behavior of the coating and the two-domain Tait PVT model is used to describe the compressibility of the thermoplastic substrate. A computer code has been developed and verified by an analytical solution and a set of experiments.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A computer-implemented method of controlling an in-mold coating apparatus predicting a fill pattern and coating pressure distribution for a substrate having a plurality of possible inlet nodes for injection, the method comprising:
   initializing pressure and thickness change of the substrate for at least one of the inlet nodes;
   determining which of the inlet nodes are newly filled nodes and new flow front nodes;
   calculating pressure for the newly filled nodes;
   updating thickness and coating volume of the substrate;
   checking if pressure and time step have converged, and updating pressure and time step and returning to the pressure calculation step if pressure and time step calculations have not converged;
   determining whether the substrate is filled, and updating filling time and returning to the determining step if the substrate is not filled; and
   using the fill pattern to determine the most beneficial placement of injection nozzles in the mold.

2. The method defined in claim 1, wherein the initializing step further comprises:
   inputting a plurality of initial parameters;
   determining an initial computation domain;
   solving pressure iteratively at each of the inlet nodes;
   calculating corresponding nodal specific volume and coating thickness; and
   calculating filling time needed to fill the initial computation domain.

3. The method defined in claim 2, wherein coating thickness is represented by:

$$h = h_s(1 - V/V_0),$$

wherein $h_s$ is the original thickness of the substrate right before injection; V is the specific volume of the substrate; $V_0$ is the specific volume of the substrate right before injection.

4. The method defined in claim 2, wherein the initial parameters comprise finite element method geometry data, processing conditions required for the flow calculation, inlet node number, and convergence criteria of the calculation.

5. The method defined in claim 2, wherein the determining newly filled nodes and new flow front nodes step further comprises:
   calculating the flow rate into the flow front nodes;
   determining the new filled node, new flow front location and initial time step;
   calculating the fill factors for each flow front node
   giving an initial value for the pressure iteration of the newly filled nodes, and
   updating the control volume of all filled nodes and flow front nodes.

6. The method defined in claim 1, wherein the substrate comprises a thermoplastic part.

7. The method defined in claim 1, wherein the substrate comprises a thermoset part.

8. A recording medium readable with a computer for storing a program to control an in-mold coating apparatus by predicting a fill pattern and coating pressure distribution for a substrate having a plurality of possible inlet nodes for injection and realize functions of:
   initializing pressure and thickness change of the substrate for at least one of the inlet nodes;
   determining newly filled nodes and new flow front nodes;
   calculating pressure for the newly filled nodes;
   updating thickness and coating volume of the substrate;
   checking if pressure and time step have converged, and updating pressure and time step and returning to the pressure calculation step if pressure and time step calculations have not converged;
   determining whether the substrate is filled, and updating filling time and returning to the determining step if the substrate is not filled; and
   using the fill pattern to determine the most beneficial placement of injection nozzles in the mold.

9. The recording medium defined in claim 8, the program further realizing the functions of:
   inputting a plurality of initial parameters;
   determining an initial computation domain;
   solving pressure iteratively at each of the inlet nodes;
   calculating corresponding nodal specific volume and coating thickness; and
   calculating filling time needed to fill the initial computation domain.

10. The recording medium defined in claim 9, wherein coating thickness is represented by:

$$h=h_s(1-V/V_0),$$

wherein $h_s$ is the original thickness of the substrate right before injection; V is the specific volume of the substrate; $V_0$ is the specific volume of the substrate right before injection.

11. The recording medium defined in claim 9, wherein the initial parameters comprise finite element method geometry data, processing conditions required for the flow calculation, inlet node number, and convergence criteria of the calculation.

12. The recording medium defined in claim 9, the program further realizing the functions of:
   calculating the flow rate into the flow front nodes;
   determining the new filled node, new flow front location and initial time step;
   calculating the fill factors for each flow front node
   giving an initial value for the pressure iteration of the newly filled nodes, and
   updating the control volume of all filled nodes and flow front nodes.

13. The recording medium defined in claim 8, wherein the substrate comprises a thermoplastic part.

14. The recording medium defined in claim 8, wherein the substrate comprises a thermoset part.

15. A system controlling an in-mold coating process predicting a fill pattern and coating pressure distribution for a substrate having a plurality of possible inlet nodes for injection, the system comprising:
   means for initializing pressure and thickness change of the substrate for at least one of the inlet nodes;
   means for determining newly filled nodes and new flow front nodes;
   means for calculating pressure for the newly filled nodes;
   means for updating thickness and coating volume of the substrate;
   means for checking if pressure and time step have converged, and means for updating pressure and time step and means for returning to the pressure calculation step if pressure and time step calculations have not converged;
   means for determining whether the substrate is filled, and means for updating filling time and returning to the determining step if the substrate is not filled; and
   means for using the fill pattern to determine the most beneficial placement of injection nozzles in the mold.

16. The system defined in claim 15, further comprising:
   means for inputting a plurality of initial parameters;
   means for determining an initial computation domain;
   means for solving pressure iteratively at each of the inlet nodes;
   means for calculating corresponding nodal specific volume and coating thickness; and
   means for calculating filling time needed to fill the initial computation domain.

17. The system defined in claim 16, wherein coating thickness is represented by:

$$h=h_s(1-V/V_0),$$

wherein $h_s$ is the original thickness of the substrate right before injection; V is the specific volume of the substrate; $V_0$ is the specific volume of the substrate right before injection.

18. The system defined in claim 16, wherein the initial parameters comprise finite element method geometry data, processing conditions required for the flow calculation, inlet node number, and convergence criteria of the calculation.

19. The system defined in claim 16, further comprising:
   means for calculating the flow rate into the flow front nodes;
   means for determining the new filled node, new flow front location and initial time step;
   means for calculating the fill factors for each flow front node
   means for giving an initial value for the pressure iteration of the newly filled nodes, and
   means for updating the control volume of all filled nodes and flow front nodes.

20. The system defined in claim 15, wherein the substrate comprises a thermoplastic part.

21. The system defined in claim 15, wherein the substrate comprises a thermoset part.

* * * * *